United States Patent Office 3,166,613
Patented Jan. 19, 1965

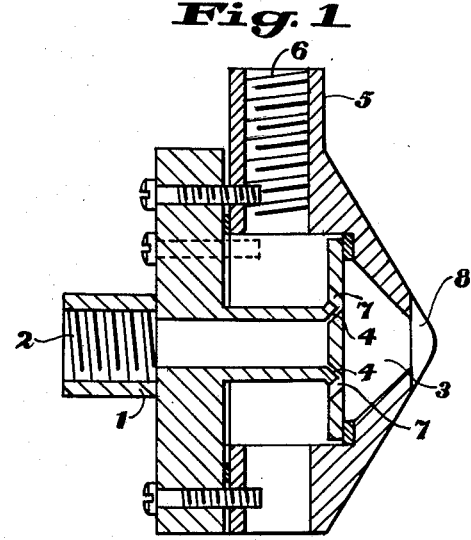
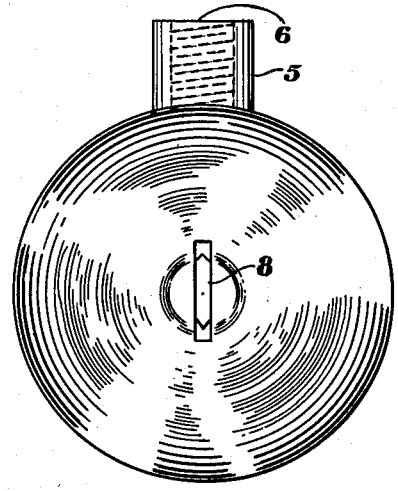

3,166,613
POLYOLEFIN POWDER PROCESS
James F. Wright and Norman D. Shahan, Longview, Tex., assignors to Eastman Kodak Company, Rochester, N.Y., a corporation of New Jersey
Filed Feb. 8, 1962, Ser. No. 171,919
5 Claims. (Cl. 264—12)

This invention relates to the process of producing powdered polyethylene.

Powdered polyethylene is useful for many purposes, such as injection molding, coating objects using a fluidized bed, rubber compounding, paper coating, and ink and paint formulation. In order to provide polyethylene powder of the proper size, various methods have been proposed, such as the mechanical grinding of polyethylene pellets, precipitation from a solution of polyethylene, and the spray cooling method in which a spray of molten polyethylene is directed into a chamber. It has also been suggested that powdered polyolefins be obtained directly from the reactor stream by impinging the heated mixed reactants against a stream of liquid water. However, there would be a loss of expensive monomers in a system where the reactants from the polymerization itself were used to provide polyethylene powder without a recovery and separation step prior to the formation of powder.

Another suggested process involves spraying molten polyolefins into a separate stream of water. Operation in this manner requires the use of very large flow rates for the quenching medium and handling great volumes is not only costly in terms of materials and equipment but also involves additional separation or drying procedures.

Various methods can be used to advantage, depending upon the type of polyethylene which is used and the resulting product which is desired. However, the grinding method is not suitable for use with wax-type polyethylenes and the methods involving either precipitation or water baths require extensive moisture removal to obtain a marketable product.

It has been desired to obtain a spray process having a relatively low pressure operation and which is less expensive from a construction standpoint than processes in which molten polyolefin is sprayed into a room or some type of quenching medium. It would also be preferred to obtain cooling and solidification of the atomized polymer without circulation of a large mass of air, and the process should be applicable to higher viscosity materials when producing a given particle size in order to provide a range of operations. It should also be capable of producing extremely small particle sizes.

We have found a relatively inexpensive method of making powdered polyethylene which is more efficient than the prior art processes and which produces a very fine, high-grade powder.

One object of this invention is to provide a high-grade polyethylene powder of extremely small particle size. Another object is to provide a process for making polyethylene powder. An additional object is to provide an economical relatively low pressure spraying operation which combines simple cooling and solidification of the atomized polymer and can be used for atomizing higher viscosity polyolefins.

The above objects are obtained by pumping molten polyethylene into a high velocity gas or vapor stream and then discharging the mixed stream through a suitable nozzle to essentially atmospheric pressure. Atomization is immediately followed by the particles freezing and dropping into a collector. The polyethylene at the spray nozzle has a temperature of 120–300° C. and a pressure of 100–500 lbs./sq. in. gauge. The use of steam or an inert gas such as nitrogen, helium, etc. reduces the hazard of a dust explosion in the collector.

Accurate control of the process can be obtained by adjusting the following variables:

(1) Polymer temperature, 120°–300° C.
(2) Polymer pressure at injection point, 100–500 p.s.i.g.
(3) Polymer injection rate, 90 lbs./hr.–225 lbs./hr.
(4) Pressure of gas or vapor at injection point, 200 p.s.i.g., max.
(5) Gas or vapor flow rate, limited by atomizing fluid/polymer ratio and nozzle design.

For instance, polymer pressure and injection rate affect the droplet formation rate and size. Gas pressure and flow rate also affect the rate and size of droplet formation. Control of the gas pressure determines the amount of expansion which accompanies dispersion to atmospheric pressure and is critical in the achievement of satisfactory, uniform atomization.

One embodiment of the two-fluid nozzle which can be used in our invention is illustrated by the drawing. FIG. 1 shows a vertical section of the nozzle which comprises a cylindrical tubular member 1 having at one end an inlet 2 for liquid polyethylene connecting to the pre-mixing chamber 3 through orifice holes 4. The tubular member 1 is surrounded by a second and co-axial tubular member 5 provided with a gas or vapor inlet 6 and connecting through orifice holes 7 to the pre-mixing chamber 3. The pre-mixing chamber 3 discharges through nozzle opening 8 to the atmosphere. FIG. 2 shows a front elevation of the two-fluid nozzle showing the discharge orifice.

When using our process for obtaining powders from wax-type polyethylenes, an atomizing fluid ratio of gas to wax of 0.1 lb./lb.–5.0 lb./lb. is used.

Single fluid nozzles which may be used in our invention are illustrated in Perry's Chemical Engineering Handbook, 3rd edition, 1950, pp. 1170–1172. A single fluid nozzle contains only one opening through which the fluid may enter the nozzle whereas a two-fluid nozzle contains two entry passages as shown in the drawing.

The following examples are illustrative of our invention but are not intended to limit it in any way:

EXAMPLE 1

Polyethylene wax sold as Epolene N–10 (1600–2300 centipoises viscosity at 125° C.) was powdered using air and a nozzle having only one entry passage. The molten polymer was injected into the air stream 8 inches upstream from the nozzle and at the following conditions and rate:

Temperature—170° C.
Pressure—175 p.s.i.g.
Rate—90 lbs./hr.

Air was supplied by a compressor at the following conditions and rate:

Pressure—125 p.s.i.g.
Rate—30 lbs./hr.

The mixture of molten polymer and air discharged through the nozzle, resulting in atomization. The atomized particles cooled and dropped into a collector. The powder resembled white corn meal.

Properties other than physical shape were not affected by powdering.

EXAMPLE 2

Polyethylene wax sold as Epolene N–11 (250–450 centipoises viscosity at 125° C.) was powdered using steam and a nozzle having two entry passages. Polymer was pumped through one entry at the following conditions and rate:

Temperature—135° C.
Pressure—250 p.s.i.g.
Rate—225 lbs./hr.

Steam was supplied through the other entry at the following conditions and rate:

Pressure—154 p.s.i.g.
Rate—100 lbs./hr.

The molten polymer discharged through orifices into the steam and the mixture discharged to essentially atmospheric pressure through an opening in the nozzle. The atomized particles cooled and dropped into a collector. The powder resembled flour except that it was not as free flowing.

EXAMPLE 3

Polyethylene wax sold as Epolene E-10 (900–1500 centipoises viscosity at 125° C.) was powdered using steam and a two-fluid spray nozzle (Sar-Jet ordering head). The molten polymer was pumped through one entry at the following conditions:

Temperature—165° C.
Pressure—340 p.s.i.g.
Rate—160 lbs./hr.

Steam was supplied to the other entry of the nozzle at 160 p.s.i.g. at the rate of approximately 190 lbs./hr. The steam and molten polymer mixture discharged through the nozzle to essentially atmospheric pressure producing a fine white solid powder which dropped into a collector. Sieve analyses and other typical properties of the three Epolenes mentioned in the above examples are shown in Table I.

Table I.—Typical properties of powdered Epolenes

SIEVE ANALYSES

| Epolene | N-10 | N-11 | E-10 |
|---|---|---|---|
| Atomizing Fluid | Air | Steam | Steam |
| Nozzle | Single Fluid | Two Fluid | Two Fluid |
|  | Percent | Percent | Percent |
| Retained on 20 mesh | 12.8 | | 4.3 |
| Retained on 50 mesh | 64.5 | 12.0 | 11.5 |
| Retained on 100 mesh | 20.2 | 11.5 | 16.1 |
| Through 100 mesh | 2.5 | | 68.1 |
| Retained on 200 mesh | | 15.5 | |
| Through 200 mesh | | 61.0 | |
|  | 100.0 | 100.0 | 100.0 |

PHYSICAL AND CHEMICAL PROPERTIES

| Epolene | N-10 | N-11 | E-10 |
|---|---|---|---|
| Color (Gardner Scale) | 1 | 1 | 1 |
| Acid No | 0.05 | 0.05 | 15.5 |
| Viscosity at 125° C., cp | 1,940 | 420 | 1,100 |
| Cloud Point, ° C | 87.2 | 86.8 | 78.3 |
| Softening Point ° C | 112.7 | 106.7 | 105.5 |
| Density (Annealed) | 0.9279 | 0.9223 | 0.9414 |
| Penetration (1/10 of mm.) | 1.4 | 2.4 | 1.5 |

The Epolenes are wax-type polyethylenes obtained from Eastman Chemical Products, Inc. Polyolefins other than polyethylene may be used in our invention, including polypropylene and polyolefin blends. The preferred polyolefins are the poly-α-olefins obtained from the α-olefins having 2–10 carbon atoms.

Our process does not require a drying step, but if additional drying is required, it may be accomplished by passing the powder through a heated area or by the use of dry air or gas stream.

Powder prepared according to the process described herein is considerably finer than material produced by many known processes. This finer powder is preferred, since it blends more readily with other materials, gives more uniform paints and inks, and renders a smoother melt coating.

The invention has been described in detail with particular reference to preferred embodiments thereof, but it will be understood that variations and modifications can be effected within the spirit and scope of the invention as described hereinabove and as defined in the appended claims.

We claim:
1. A process which comprises
   (1) adding molten polyolefin under a pressure of from about 100 p.s.i.g. to 500 p.s.i.g. and at a temperature of from about 120° C. to 300° C. to a high velocity gas stream maintained at a pressure substantially above atmospheric temperature, said molten polyolefin being added in substantially non-filamentary form,
   (2) turbulently mixing the combined molten polyolefin and gas upstream from a nozzle having a single fluid inlet at one end thereof and an orifice at the other end thereof,
   (3) forcing the mixture of molten polyolefin and gas under pressure through the orifice of the nozzle and into an area of substantially reduced pressure whereby the molten polyolefin is atomized into finely divided discrete particles.
2. The process of claim 1 wherein the polyolefin employed is normally solid at room temperature and has a viscosity of less than about 3,000 centipoises at a temperature of about 25° C. above its melting point.
3. The process of claim 1 wherein the polyolefin employed is predominantly polyethylene having a viscosity of less than about 3,000 centipoises at 125° C.
4. The process of claim 1 wherein the gas employed is steam.
5. A process which comprises
   (1) adding, under a pressure of about 175 p.s.i.g., a polyethylene wax having a viscosity of from about 1600 to 2300 centipoises at 125° C. in fused substantially non-filamentary form and having a fused temperature of about 170° C. to a high velocity gas stream maintained at a pressure substantially above atmospheric temperature,
   (2) turbulently mixing the combined fused polyethylene and gas upstream from a nozzle having a single fluid inlet at one end thereof and an orifice at the other end thereof,
   (3) forcing the mixture of fused polyethylene and gas under pressure through the orifice of the nozzle and into an area of substantially reduced pressure whereby the fused polyethylene is atomized into finely divided discrete particles.

References Cited by the Examiner

UNITED STATES PATENTS

| 2,437,263 | 3/48 | Manning. |
| 2,508,462 | 5/50 | Marshall. |
| 2,673,121 | 3/54 | Brennan. |
| 2,862,242 | 12/58 | Jones et al. _____ 18—47.3 |
| 3,004,719 | 10/61 | Pouppirt. |

FOREIGN PATENTS

| 575,389 | 5/59 | Canada. |
| 609,560 | 10/48 | Great Britain. |

ALEXANDER H. BRODMERKEL, Primary Examiner.
MICHAEL V. BRINDISI, Examiner.